US011507638B2

(12) United States Patent
Mori

(10) Patent No.: US 11,507,638 B2
(45) Date of Patent: Nov. 22, 2022

(54) WEB CONTENT AUTOMATED GENERATION SYSTEM

(71) Applicant: TSUNAGU.AI, INC., Tokyo (JP)

(72) Inventor: Takaaki Mori, Tokyo (JP)

(73) Assignee: TSUNAGU.AI, INC., Tokyo (JP)

( * ) Notice: Subject to any disclaimer, the term of this patent is extended or adjusted under 35 U.S.C. 154(b) by 0 days.

(21) Appl. No.: 17/252,480

(22) PCT Filed: Jun. 13, 2019

(86) PCT No.: PCT/JP2019/023436
§ 371 (c)(1),
(2) Date: Dec. 15, 2020

(87) PCT Pub. No.: WO2019/244762
PCT Pub. Date: Dec. 26, 2019

(65) Prior Publication Data
US 2021/0192007 A1     Jun. 24, 2021

(30) Foreign Application Priority Data
Jun. 21, 2018  (JP) .............................. JP2018-117710

(51) Int. Cl.
G06F 16/958        (2019.01)
G06F 16/955        (2019.01)
G06F 16/957        (2019.01)

(52) U.S. Cl.
CPC .......... *G06F 16/972* (2019.01); *G06F 16/955* (2019.01); *G06F 16/9577* (2019.01)

(58) Field of Classification Search
CPC ... G06F 16/972; G06F 16/955; G06F 16/9577
See application file for complete search history.

(56) References Cited

U.S. PATENT DOCUMENTS 8,965,988 B1 *  2/2015  Negahban ............... H04W 4/90
                                                  709/206
10,452,782 B1 * 10/2019  Kumar ................... G06N 20/00
(Continued)

FOREIGN PATENT DOCUMENTS

CN         101650745 A      2/2010
CN         101763395 A      6/2010
(Continued)

OTHER PUBLICATIONS

Beltramelli, Tony, "pix2code: Generating Code from a Graphical User Interface Screenshot" Jun. 19, 2018, EICS p. 1-6 (Year: 2018).*

(Continued)

*Primary Examiner* — Stephen S Hong
*Assistant Examiner* — Nicholas Hasty
(74) *Attorney, Agent, or Firm* — Harness, Dickey & Pierce, P.L.C.

(57) ABSTRACT

Provided is a web content automated generation system capable of simply creating web content without editing a programming language. A web content automated generation system includes an image data acquisition unit configured to acquire web content as one piece of image data, a source code acquisition unit configured to acquire a source code including HTML data constituting the web content, a learning unit configured to acquire teacher data by analyzing the image data and the source code, an image data registration unit configured to input web content to be created as one piece of image data, an analysis unit configured to analyze a degree of relevance between the input image data and teacher data stored in teacher data storage unit, and a content source code generation unit configured to generate content source code regarding the input image data on the basis of (Continued)

a source code of the teacher data having a high degree of relevance analyzed by the analysis unit.

11 Claims, 10 Drawing Sheets

(56) References Cited

U.S. PATENT DOCUMENTS

| | | | | |
|---|---|---|---|---|
| 10,489,126 | B2* | 11/2019 | Kumar | G06N 20/00 |
| 10,831,991 | B1* | 11/2020 | Hansen | G06T 7/0002 |
| 10,902,254 | B2* | 1/2021 | Lodhia | G06K 9/00852 |
| 2010/0235737 | A1* | 9/2010 | Koh | G06F 3/0482 |
| | | | | 715/704 |
| 2017/0357913 | A1* | 12/2017 | Garrison | G06F 40/143 |

FOREIGN PATENT DOCUMENTS

| | | |
|---|---|---|
| JP | 2016/519347 A | 6/2016 |
| JP | 2017/45349 A | 3/2017 |
| WO | WO-2011/029252 A1 | 3/2011 |

OTHER PUBLICATIONS

C. Saini and V. Arora, "Information retrieval in web crawling: A survey," 2016 International Conference on Advances in Computing, Communications and Informatics (ICACCI), 2016, pp. 2635-2643, doi: 10.1109/ICACCI.2016.7732456. (Year: 2016).*
International Search Report PCT/ISA/210 for International Application No. PCT/JP2019/023436 dated Aug. 20, 2019.
Japanese Office Action dated Aug. 5, 2021 issued in corresponding Japanese Patent Application No. 2020-525644. English translation has been provided.
URL: Http://ledge.ai/pix2code-on-floydhub/ AI Automatically codes website (online) "Auto HTML Coding with Deep Learning" Jan. 18, 2018, search date Jul. 29, 2021.
Japanese Office Action dated Jun. 8, 2022 issued in corresponding Japanese Patent Application No. 2020-525644 and English translation thereof.
Beltramelli, "pix2code: Generating Code from a Graphical User Interface Screenshot," Sep. 19, 2017.

* cited by examiner

*FIG. 3*

WEB PAGE DATABASE 310

| SEARCH INFORMATION: "CAREER", "WOMAN", "FASHION", AND "ONLINE SHOPPING" | | |
|---|---|---|
| URL | IMAGE DATA | HTML DATA |
| http://www.・・・ | × × | × × |
| http://www.・・・ | × × | × × |
| http://www.・・・ | × × | × × |
| http://www.・・・ | × × | × × |
| ⋮ | ⋮ | ⋮ |

HTML DATA

```
<!DOCTYPE html>
<html lang="ja" class="no-js">
<head>
<!--[if lt IE 9]>
   <script src="js/css3-mediaqueries.js"></script>
   <script src="js/html5shiv-printshiv.js"></script>
<![endif]-->
<meta charset="UTF-8">
<meta name="viewport" content="width=device-width,initial-scale=1">
<meta name="keywords" content="FASHION ONLINE SHOPPING LADIES FASHION">
<meta name="description" content=" ADULT WOMEN'S CASUAL FASHION ONLINE SHOPPING SITE! FREE SHIPPING ON ORDERS OF 9800 YEN OR MORE! LINEUP OF TRENDY ITEMS!">
<title> FOR CASUAL FASHION OF ADULT WOMEN, LADIES' FASHION ONLINE SHOPPING SITE OO TRADING COMPANY OFFICIAL ONLINE SHOPPING SITE </title>
<link rel="stylesheet" href="css/setting.css">
<link rel="stylesheet" href="css/reset.css" media="all">
<link rel="stylesheet" href="css/navicolor.css" media="all">
<link rel="stylesheet" href="css/urs_base.css" media="all">
      .
      .
      .
```

WEB CONTENT AUTOMATED GENERATION SYSTEM

CROSS-REFERENCE TO RELATED APPLICATIONS

This application is a national phase under 35 U.S.C. § 371 of PCT International Application No. PCT/JP2019/023436 which has an International filing date of Jun. 13, 2019, which claims priority to Japanese Patent Application No. 2018-117710, filed Jun. 21, 2018, the entire contents of each of which are hereby incorporated by reference.

TECHNICAL FIELD

The present disclosure relates to a web content automated generation system, and is particularly useful as a system for automatedly generating a web page to be released on the Internet.

BACKGROUND ART

There has been a rapid increase in the number of cases in which companies or business owners create web pages that introduce products or services in order to sell their own products or services, and release the web pages to the public on the Internet as websites recently. Consumers can browse a website of each company released on the Internet and use the website as a reference for purchasing products or services.

Such a website is created on the basis of a markup language such as a Hyper Text Markup Language (HTML), a cascading style sheet (CSS) that is a language for designating a style of a web page, a programming language such as Java Script (JS (registered trademark)) that can cause a web page to have motion and interactivity, and image data in a data format such as jpg or png for displaying photos or illustrations. When a website is created and released, knowledge regarding a markup language and a programming language for creating content, and knowledge regarding a web server for uploading created content on the web server are necessary. This generally means that a website web creator with knowledge and experience performs these tasks.

Incidentally, it is said that there are billions of such websites around the world. Once a website is created, the publication can be maintained as long as the released information is not out of date. Accordingly, the number of released websites is steadily increasing.

It is becoming more important for a business operator to have a website as the number of websites increases. Manufacturers that had not created websites until now or those in industries that are thought of as unrelated to websites have begun to create websites one after another. Therefore, a demand for website creation is increasing, a job-openings-to-applicants ratio of web creators is increasing, and an amount of human supply is not catching up due to the shortage of human resources.

Because the number of websites is increasing and versions of the HTML, CSS, and JS languages are increasing, a level required for creation of websites is increasing, and this is one factor of an increase in a burden on website creators.

Japanese Unexamined Patent Publication No. 2016-591347 illustrates an example of a technology for reducing a burden of website creation includes a scheme using templates. According to the technology described in Patent Literature 1, materials necessary for website creation such as text or images to be posted on a website are prepared, and the materials are applied to a predetermined framework called a template, which makes it possible to easily create websites without any knowledge of specialized programming.

SUMMARY

Technical Problem

Using such a technology allows a person who wishes to create a website to create a website without actually operating a programming language, achieving an advantage of greatly reducing the time and effort of creating a website.

Incidentally, in a general website, a plurality of portions of text, images and/or videos are arranged in a complicated manner. When a method of creating a website using a template described in Patent Literature 1 described above is used, there is a problem that it takes time to apply each portion of text, image and/or video to each part in the template prepared in advance, and work is not efficient.

Further, simple application of the template results in an imbalance of an entire page, and after the application to the template, it may be necessary to make fine adjustments in an arrangement of text, images, and the like, the number of characters per line, positions of line breaks, or the like. In that case, because the fine adjustment is performed through editing of the markup language and the programming language, work efficiency further deteriorates.

Further, because the template prepared in advance is generally selected from a plurality of templates by a user, the above fine adjustments differ depending on a type of template that is selected, and this work is required each time a website is created. Therefore, further deterioration of work efficiency is unavoidable, and it is desired to embody a website creation system in which a burden on workers is reduced.

An object of the present disclosure is to provide a web content automated generation system capable of creating web content simply without editing a programming language even when a website has a complicated structure.

Solution to Problem

A web content automated generation system of an aspect is a web content automated generation system for automatedly generating web content described by HTML, and includes: an image data acquisition unit configured to acquire web content posted on a website released on the Internet as one piece of image data; a source code acquisition unit configured to acquire a source code including HTML data constituting the web content; a learning unit configured to acquire teacher data by analyzing the image data acquired by the image data acquisition unit and the source code acquired by the source code acquisition unit; an image data registration unit configured to input the web content to be created as one piece of image data; an analysis unit configured to analyze a degree of relevance between the input image data and the teacher data acquired by the learning unit; and a content source code generation unit configured to generate content source code regarding the input image data on the basis of the HTML data of the teacher data having a high degree of relevance analyzed by the analysis unit.

According to the web content automated generation system of an aspect, it is possible to create web content simply without editing a programming language even when a website has a complicated structure.

The web content automated generation system of an aspect further includes a website search unit configured to search for the website, wherein the website search unit searches for a website released on the Internet automatically by a crawler on the basis of input search information.

According to the web content automated generation system of the aspect, by providing a crawler that automatically searches for websites and collects teacher data regarding the websites that have been retrieved, it is possible to automatedly create a website and collect teacher data.

A web content automated generation system of an aspect includes a label impartment unit configured to acquire web content posted on a website released on the Internet and impart a label indicating content of the web content to the web content for each piece of content; a creation unit configured to create a component constituting a part of the web content on the basis of a source code for generating the web content; a learning unit configured to acquire teacher data on the basis of the content to which the label is imparted by the label impartment unit and on the basis of the source code and the component created by the creation unit; a web design acquisition unit configured to acquire a web design for creating web content; and a content source code generation unit configured to acquire the content of the web design on the basis of the web design acquired by the web design acquisition unit and the teacher data acquired by the learning unit, and generate a source code according to the content.

In the web content automated generation system of an aspect, the content source code generation unit may generate a source code corresponding to the component on the basis of the teacher data when a part of the content of the web design corresponds to the component.

In the web content automated generation system of an aspect, the content source code generation unit may generate position information for arranging the content in the web content on the basis of a position at which the content is described in the web design.

In the web content automated generation system of an aspect, when the web design includes an image, the web design acquisition unit may acquire image data corresponding to the image, and the content source code generation unit may generate position information for arranging the image based on the image data in the web content on the basis of a position of the image in the web design.

A web content automated generation system of an aspect includes a label impartment unit configured to acquire web content posted on a website released on the Internet and impart a label indicating content of the web content to the web content for each piece of content; a creation unit configured to create a component constituting a part of the web content on the basis of a source code for generating the web content; a learning unit configured to acquire teacher data on the basis of the content to which the label is imparted by the label impartment unit and on the basis of the source code and the component created by the creation unit; a web design acquisition unit configured to acquire a web design for creating web content; and a content source code generation unit configured to acquire the content of the web design on the basis of the web design acquired by the web design acquisition unit and the teacher data acquired by the learning unit, and generate a source code according to the content.

In the web content automated generation system of an aspect, the content source code generation unit may generate a source code corresponding to the component on the basis of the teacher data when a part of the content of the web design corresponds to the component.

In the web content automated generation system of an aspect, the content source code generation unit may generate position information on a position at which the content is arranged in the web content to correspond to a layout of the content of the web design on the basis of the position of the content in the web design.

In the web content automated generation system of an aspect, when the web design includes an image, the web design acquisition unit may acquire image data corresponding to the image, and the content source code generation unit may generate position information for arranging the image based on the image data in the web content on the basis of a position of the image in the web design.

Advantageous Effects

According to the web content automated generation system, it is possible to create web content simply without editing a markup language or a programming language even when a website has a complicated structure.

BRIEF DESCRIPTION OF DRAWINGS

FIG. 3 is a diagram illustrating an example of a web page database 310.

FIG. 5 is a diagram illustrating an example of HTML data 2000 that is a source code for describing a web page.

DESCRIPTION OF EMBODIMENTS

Hereinafter, modes for carrying out the present disclosure will be described with reference to the drawings. These are only examples, and do not limit the technical scope of the present disclosure.

First Embodiment

First, a first embodiment will be described.

Configuration of Web Content Automated Generation System 1

Figure 1:
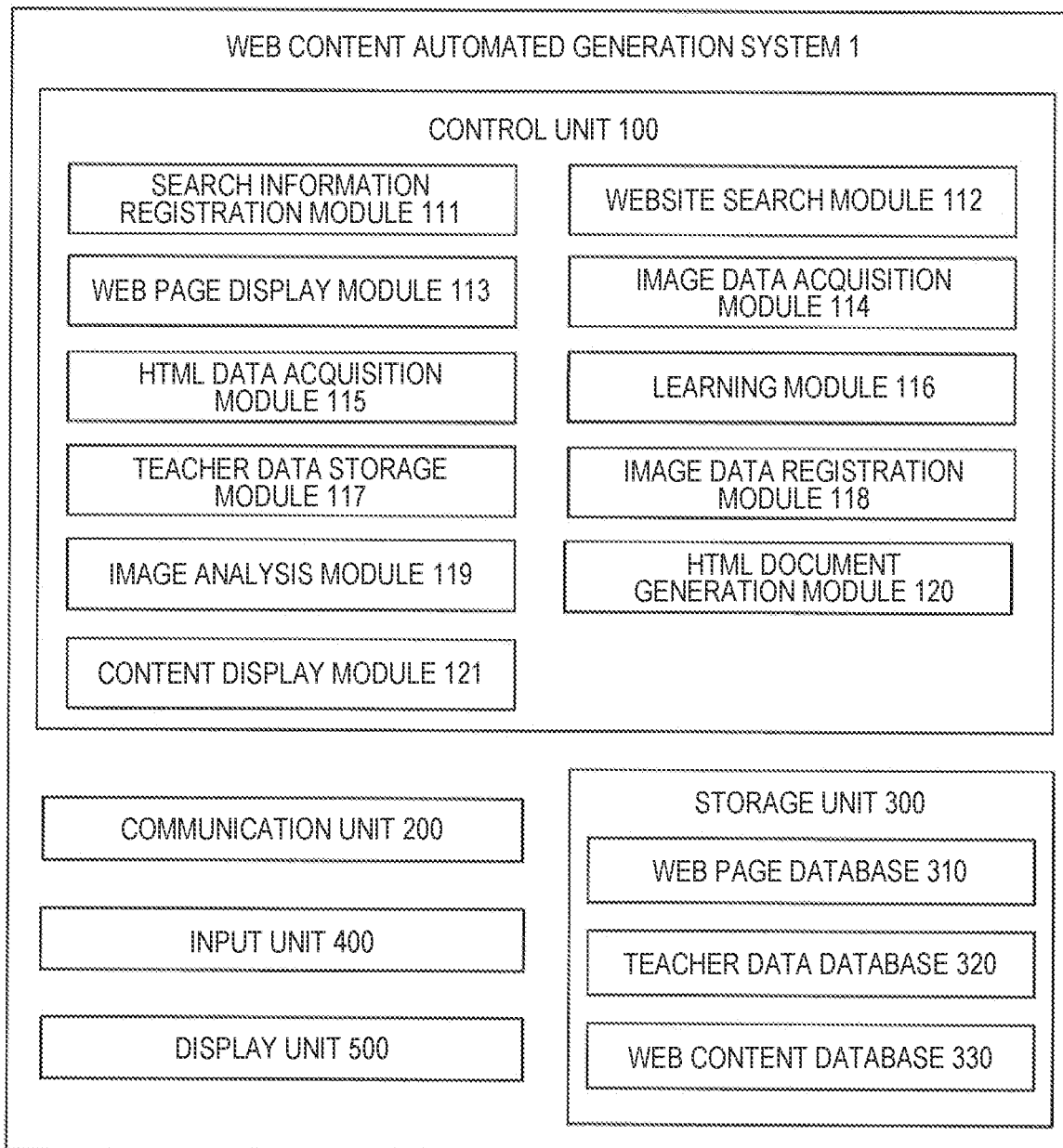
FIG. 1 is a block diagram illustrating a hardware configuration and software functions of a web content automated generation system 1 according to a first embodiment.

FIG. 1 is a block diagram illustrating a hardware configuration and software functions of a web content automated generation system 1 according to the first embodiment.

The web content automated generation system 1 includes a control unit 100 that controls data, a communication unit 200 that communicates with a user or other devices, a storage unit 300 that stores data, an input unit 400 that receives an input of information from the user, and a display unit 500 that outputs data or images controlled by the control unit 100.

The control unit 100 includes a central processing unit (CPU), a random access memory (RAM), a read only memory (ROM), a graphic processing unit (GPU), and the like.

The communication unit 200 includes a device for enabling communication with other devices, such as a Wi-Fi (Wireless Fidelity)-compatible device conforming to IEEE 802.11 and a device in which hardware capable of using a TCP/IP protocol is mounted.

The control unit 100 reads a predetermined program and cooperates with the communication unit 200 and the storage unit 300 as necessary to embody a search information registration module 111, a website search module 112, a web page display module 113, an image data acquisition module 114, an HTML data acquisition module (source code acquisition module) 115, a learning module 116, a teacher data storage module 117, an image data registration module 118, an image analysis module 119, and a content source code generation module 120.

The storage unit 300 is a device that stores data or files, and includes a data storage unit such as a hard disk, a semiconductor memory, a recording medium, or a memory card. The storage unit 300 stores a web page database 310, a teacher data database 320, and a web content database 330, which will be described below.

A type of the input unit 400 is not particularly limited. Examples of the input unit 400 include a keyboard, a mouse, a touch panel, and the like.

A type of display unit 500 is not particularly limited. Examples of the display unit 500 include a monitor, a touch panel, and the like.

Advance Preparation Using Web Content Automated Generation System 1

Figure 2:
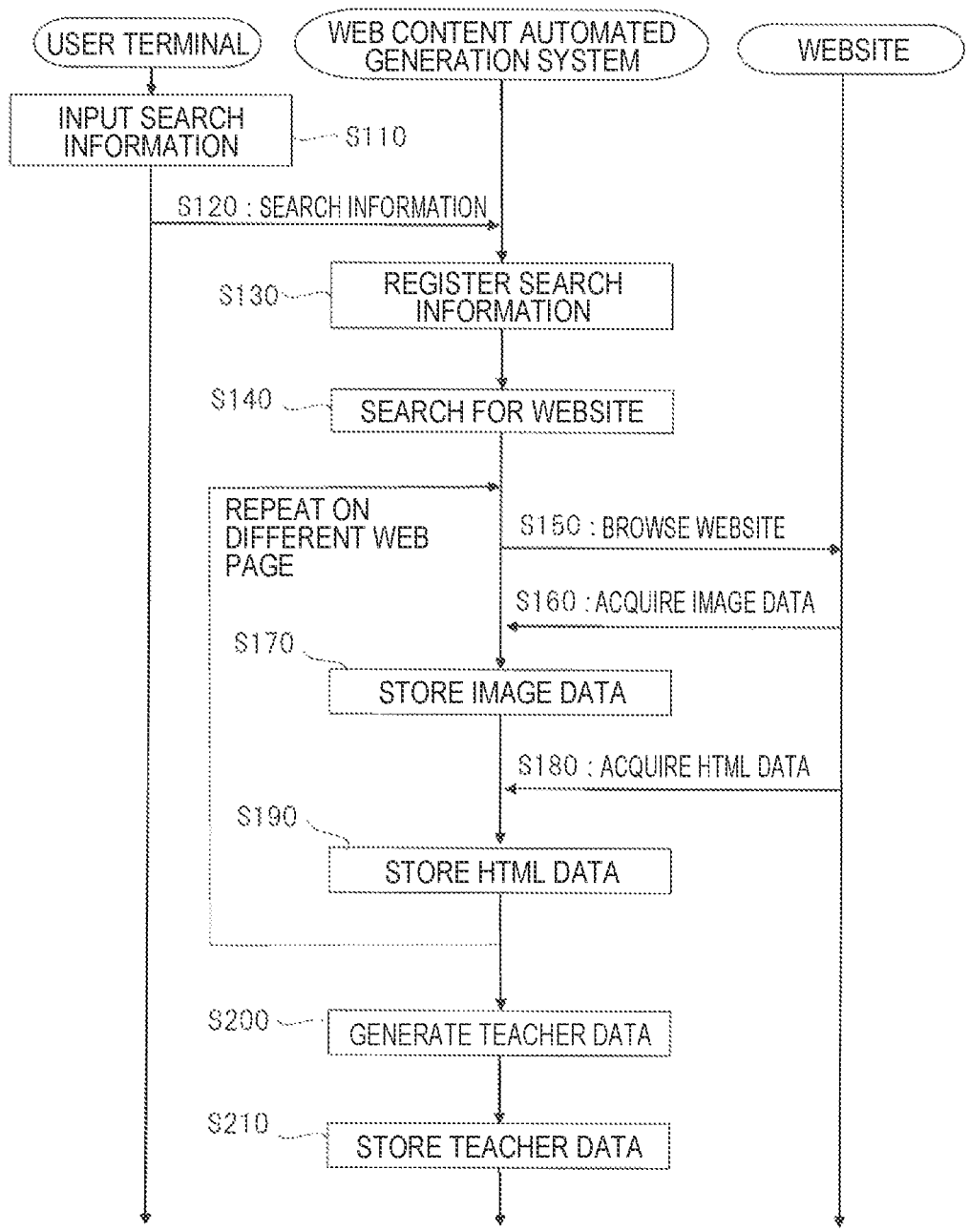
FIG. 2 is a flowchart illustrating advance preparation for automated generation of web content.
Figure 4:
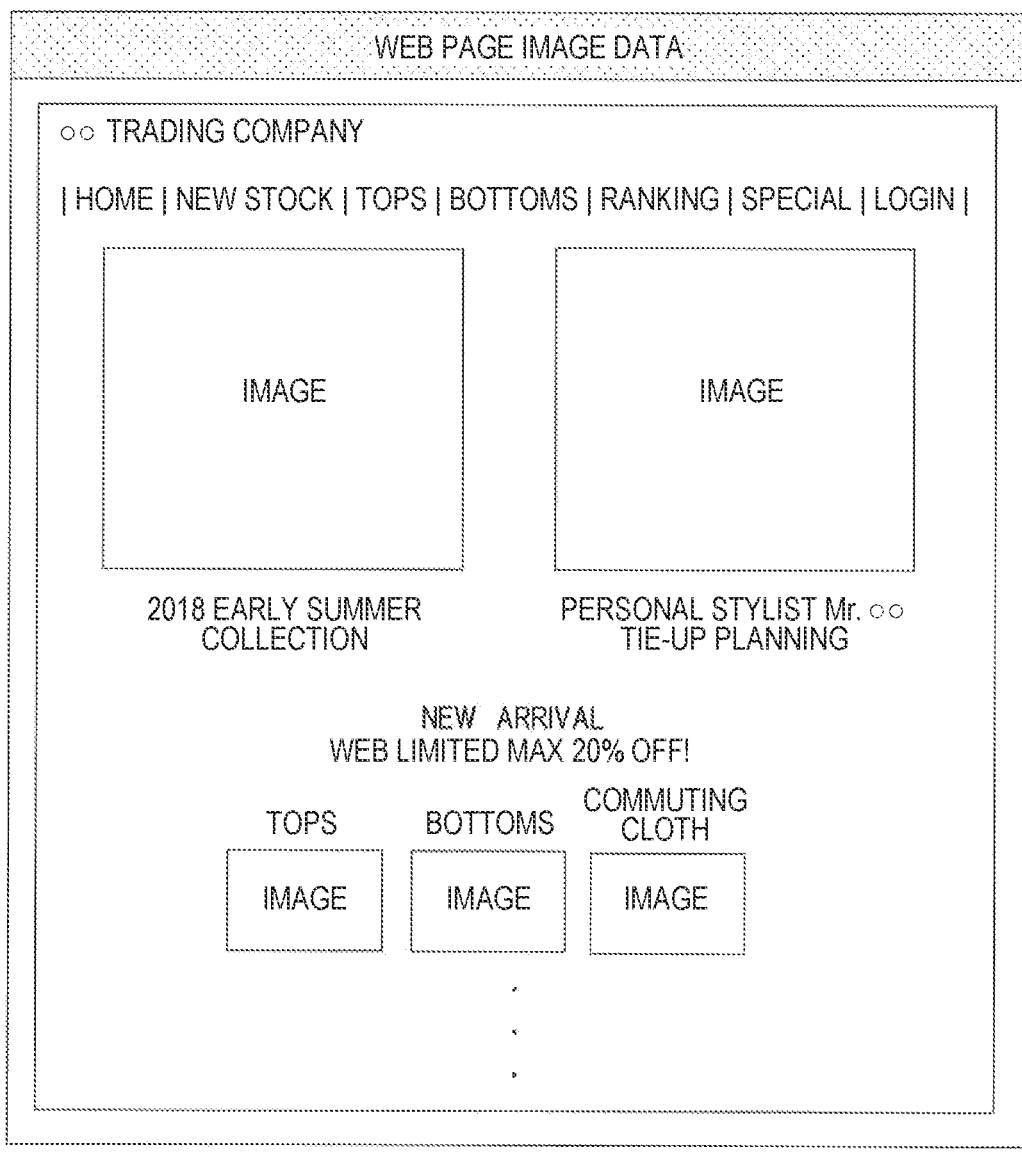
FIG. 4 is a diagram illustrating an example of image data 1000 obtained by converting a web page to an image.

Advance preparation to be performed prior to creation of web content using the web content automated generation system 1 in the present embodiment will be described. FIG. 2 is a flowchart of advance preparation using the web content automated generation system 1. Further, FIG. 3 is a diagram illustrating an example of the web page database 310. FIG. 4 is a diagram illustrating an example of image data 1000 obtained by converting a web page to an image, and FIG. 5 is a diagram illustrating an example of HTML data 2000 that is one of source codes for describing a web page. Each of the pieces of hardware described above and processing that is executed by a software module will be described with reference to FIGS. 1 to 5.

Steps S110 to S190: Collection of Information on Web Page

First, information on a related web page is collected as an advance preparation for creating web content. A user (such as a business operator; the same applies hereinafter) who wishes to create web content using the web content automated generation system 1 inputs search information for searching for websites on which web pages to be collected as teacher data are posted in a predetermined format using a user terminal (such as a business operator terminal; the same applies hereinafter) that the user uses (step S110), accesses the web content automated generation system 1 via the Internet, and transmits search information for searching for the websites to be collected (step S120).

An example of the search information input here may include keywords such as "career," "woman," "fashion," and "online shopping" for searching for related websites when an online shopping site for fashion for career women is to be created. In step S120, the search information is transmitted from the user terminal to the web content automated generation system 1 via the Internet, but the web content automated generation system 1 may be integrated with the user terminal.

When the search information is received from the user terminal, the control unit 100 of the web content automated generation system 1 executes the search information registration module 111 in cooperation with the storage unit 300, and registers the search information input by an operation of the user in the web page database 310 of the storage unit 300 illustrated in FIG. 3 (step S130).

The search information corresponding to keywords for searching for a web site on which a web page to be collected as the teacher data is posted, which is registered in step S130, uniform resource locators (URLs) assigned to the collected web pages, which will be described below, in association with the search information, image data obtained by converting the web page to an image, image data displayed on the web page, HTML data that is a source code describing the web page, CSS data for designating a style of the web page, and JS data for causing the web page to have motion or interactivity are stored in the web page database 310 illustrated in FIG. 3.

Next, the control unit 100 of the web content automated generation system 1 executes the website search module 112 in cooperation with the communication unit 200, accesses the Internet, and executes search for a website corresponding to the keyword on the basis of the keywords registered in the web page database 310 (step S140).

When a list of search results is obtained in step S140, the control unit 100 of the web content automated generation system 1 executes the web page display module 113 in cooperation with the display unit 500, and browses the website hit by the search in step S140 on a browser (step S150).

The control unit 100 of the web content automated generation system 1 executes the image data acquisition module 114 to acquire a screen displayed as the web page posted on the website as the image data 1000 (step S160), and stores the acquired image data 1000 in the web page database 310 in association with a URL of the web page in cooperation with the storage unit 300 (step S170).

When the screen displayed as the web page is converted to an image, one piece of image data 1000 can be obtained by scanning the screen displayed on the browser from end to end and connecting these screens in some cases. The obtained image data 1000 is as illustrated in FIG. 4, for example.

In FIG. 4, images regarding products or images for displaying campaigns are arranged, and text serving as a caption is added to each of the images. In step S160, all of such text or images are acquired as one piece of image data.

In addition, the control unit 100 of the web content automated generation system 1 executes a source code acquisition module 115 to acquire source code consisting of HTML data 2000, CSS data, and JS data of the browsed website as text data (step S180), and stores the acquired source code in the web page database 310 in association with the URL of the web page in cooperation with the storage unit 300 (step S190).

The source code can be obtained on the browser, and the HTML data 2000 among the obtained source code is as illustrated in FIG. 5, for example.

The web page database 310 is constructed by repeatedly executing storage of the image data 1000 and the source code in the web page database 310 for the website hit in step S140.

In the steps from the search of the website in step S140 to the collection of the source code of step S190, software called a crawler automatically searches for the website and repeatedly browses the web pages so that a plurality of pieces of image data 1000 and the source code are automatically collected.

On the other hand, a list of websites for collecting data may be provided by the user or the business operator instead of being automatically searched for using the website search module 112.

Steps S200 to S210: Learning by Associating Image Data with Source Code

When the construction of the web page database 310 ends, the control unit 100 of the web content automated generation system 1 executes the learning module 116 to perform learning on the basis of the search information stored in step S130, the image data 1000 stored in step S170, and the source code stored in step S190, and generates teacher data 3000 (step S200). This learning is performed by using a machine learning model such as a convolutional neural network (CNN) and associating information on content and arrangement of images or text with the source code. The learning in step S200 may be performed after information on all the web pages hit in the search in step S140 is collected, or information on one web page may be collected and learning may be performed each time.

The control unit 100 of the web content automated generation system 1 executes the teacher data storage module 117 in cooperation with the storage unit 300, and stores the teacher data 3000 generated by learning in step S200 in the teacher data database 320 (S210).

Thus, the image data 1000 regarding a plurality of related websites is associated with the source code, learning is performed, and resultant data is stored as the teacher data 3000, making it possible to learn what type of source code is output for what type of image data.

When the storage of the teacher data 3000 in the teacher data database 320 ends, advance preparation for the automated generation of the web content ends.

Creation of Web Content Using Web Content Automated Generation System 1

Figure 6:
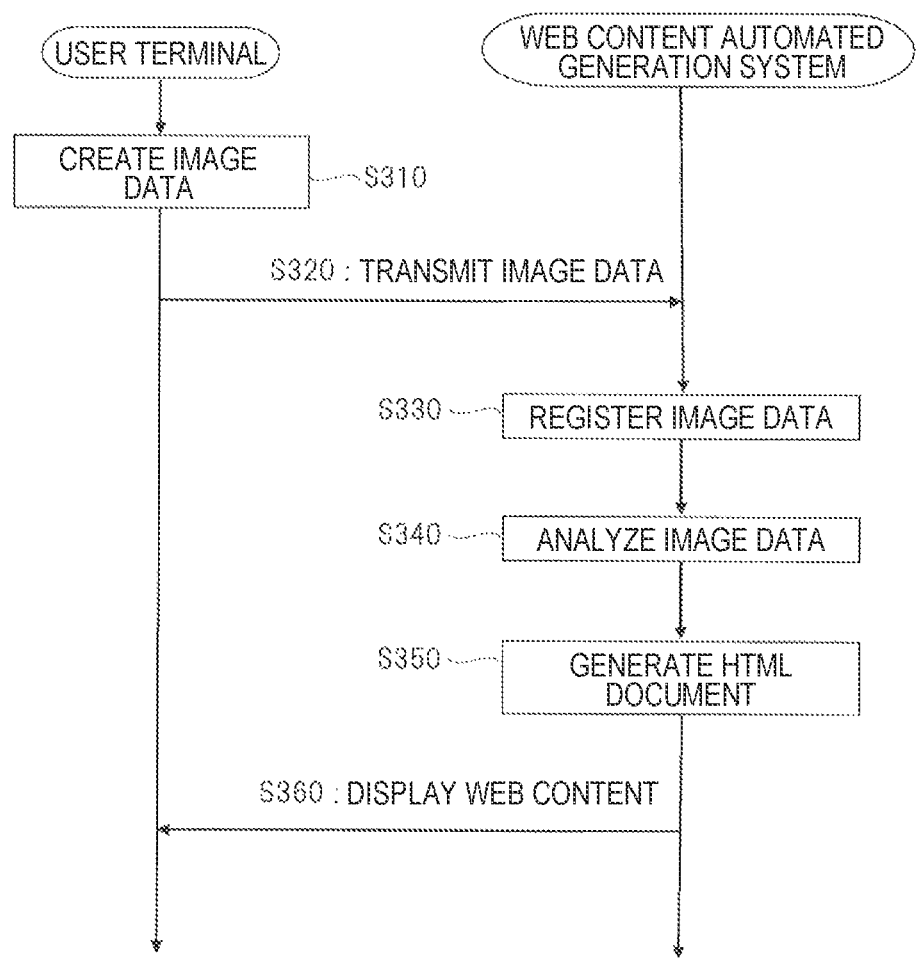
FIG. 6 is a flowchart illustrating a method of creating web content.

Next, creation of web content using the web content automated generation system 1 in the embodiment will be described. FIG. 6 is a flowchart illustrating a method of creating web content using the web content automated generation system 1.

The user who creates the web content first creates image data 4000 representing the web content to be created (step S310), and transmits the created image data 4000 to the web content automated generation system 1 (step S320).

As the image data 4000 created in step S310, data first created as a wire frame by arranging images or text using document creation software or by handwriting and then converted to image data is used.

When the image data 4000 is received in step S320, the control unit 100 of the web content automated generation system 1 executes the image data registration module 118 in cooperation with the storage unit 300, and registers the image data 4000 in the web content database 330 (step S330).

When the image data 4000 is registered in step S330, the control unit 100 of the web content automated generation system 1 executes the image analysis module 119 and analyzes the registered image (step S340).

When the image is analyzed in step S340, the registered image data 4000 is scanned and information on the content and arrangement of the images or text is collected. For the scanning of the image data 4000 at this time, the same scheme as in the scanning of the image data 1000 in step S160 is used.

Next, the control unit 100 of the web content automated generation system 1 executes the content source code generation module 120 in cooperation with the storage unit 300 to generate a content source code 5000 for generating the web content (step S350). The content source code 5000 for generating web content includes data in a markup language such as HTML data and CSS data, and data regarding the images posted on the web content. Further, JS data may be included as necessary.

When the content source code 5000 is generated in step S350, information obtained by scanning the image data 4000 is compared with a plurality of pieces of teacher data 3000 stored in the teacher data database 320, a source code of the closest teacher data 3000 is referred to, and the content source code 5000 for describing the content displayed in the image data 4000 is output. Further, post-processing such as image replacement or HTML syntax check is performed to complete the generation of the content source code 5000, as necessary.

When the content source code 5000 is generated in step S350, the control unit 100 of the web content automated generation system 1 provides the generated content source code 5000 to the user terminal, and ends the automated generation of the content (step S360).

Modification Example 1

In the web content automated generation system of the present embodiment, in step S350, the content source code 5000 is created on the basis of the registered and analyzed image data 4000 and the closest teacher data 3000, but a plurality of content source codes 5000 may be created on the basis of a plurality of similar pieces of teacher data 3000 rather than the closest teacher data 3000. In this case, because a plurality of variations of web content are generated, it is possible to generate optimal web content according to a preference of the user.

With such a configuration, it is possible to provide a web content automated generation system capable of creating web content simply without editing a programming language even when a website has a complicated structure.

Although an embodiment of the present disclosure has been described above, the present disclosure is not limited to the embodiment described above. Further, the effects described in this embodiment of the present disclosure are merely the most preferable effects obtained from the present disclosure, and the effects according to the present disclosure are not limited to those described in this embodiment of the present disclosure.

Second Embodiment

Figure 7:
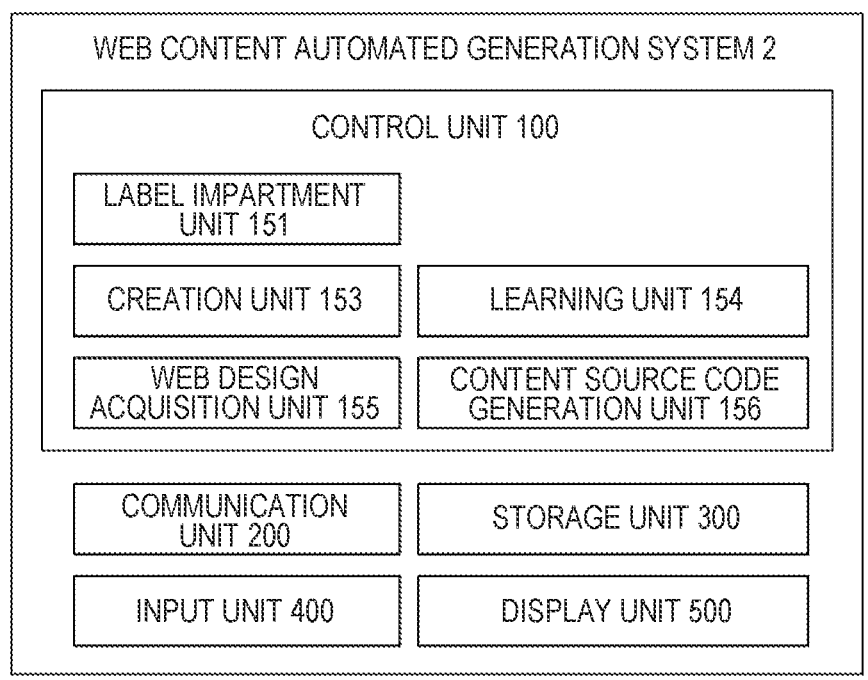
FIG. 7 is a block diagram illustrating a web content automated generation system according to a second embodiment.

Next, a second embodiment will be described. FIG. 7 is a block diagram illustrating a web content automated generation system according to the second embodiment.

The web content automated generation system 2 according to the second embodiment includes a label impartment unit 151, a creation unit 153, a learning unit 154, a web design acquisition unit 155, a content source code generation unit 156, a communication unit 200, a storage unit 300, an input unit 400, and a display unit 500.

The label impartment unit 151, the creation unit 153, the learning unit 154, the web design acquisition unit 155, and the content source code generation unit 156 are configured as one function of the control unit. Therefore, the label impartment unit 151, the creation unit 153, the learning unit 154, the web design acquisition unit 155, and the content source code generation unit 156 may be configured as a label impartment module, a creation module, a learning module, a web design acquisition module, and a content source code generation module that constitute the control unit.

The label impartment unit 151 acquires the web content posted on the website released on the Internet, and imparts a label indicating content of the web content to the web content for each piece of content.

The label impartment unit 151 acquires a plurality of pieces of web content and imparts a label to each piece of content of each piece of web content. When the image data acquired by the image data acquisition unit (the image data acquisition module 114 (see FIG. 1)) is stored in the storage unit 300, the label impartment unit 151 may acquire the image data from the storage unit 300 and impart a label to each piece of content of the image data.

The label indicates, for example, a classification of content such as images, text and buttons. For example, when the web content (image data) includes an image, text, and a button, the label impartment unit 151 imparts an image label to the image, imparts a text label to the text, and imparts a button label to the button. The label impartment unit 151 may impart a label to each piece of content of the web content, for example, on the basis of an instruction of the user using the input unit 400.

The creation unit 153 creates a component that constitutes a part of the web content on the basis of the source code for generating the web content. The creation unit 153 creates, for example, a component using a CSS code or the like. The component includes at least display information (image, character, color, shape, or the like) displayed in the web content, and can be indicated by the user. The component is, for example, a button. In addition to the buttons described above, the component may be, for example, a background, an area of a part of the background, decorations thereof, and the like. The creation unit 153 creates a plurality of components of which shapes, sizes, colors, and the like have been changed by changing the CSS code or the like.

The learning unit 154 creates teacher data on the basis of the content to which the label is imparted by the label impartment unit 151. The learning unit 154 ascertains, for example, a feature quantity of the content by using a convolutional neural network (CNN) or the like, and creates teacher data. That is, the learning unit 154, for example, learns content to which a label indicating that the content (image) is an image, the content (text) is text, and the content (button) is a button is imparted.

Further, the learning unit 154 creates teacher data on the basis of the source code and the component created by the creation unit 153. The learning unit 154 learns, for example, the CSS code created by the creation unit 153 by using a long short-term memory (LSTM) or the like. Further, the learning unit 154 may learn, for example, the component using the creation unit 153 by using a CNN or the like. The learning unit 154 creates the teacher data by combining a learning result of CSS by an LSTM or the like with a learning result of the component by a CNN or the like. As a specific example, the learning unit 154 creates the teacher data by associating the CSS code with the component.

The web design acquisition unit 155 acquires the web design for creating the web content. The web design may be the image data described in the first embodiment. When the web design includes an image, the web design acquisition unit 155 acquires data of the image (image data) and stores the image data in the storage unit 300.

The content source code generation unit 156 acquires content of the web design on the basis of the web design acquired by the web design acquisition unit 155 and the teacher data acquired by the learning unit 154, and generates a source code according to the content.

First, the content source code generation unit 156 analyzes the web design on the basis of the teacher data, detects the content in the web design, and imparts a label to each piece of content of the web design. The label may be the same as the label imparted by the label impartment unit 151, and is, for example, a classification of images, text, buttons, and the like.

When the web design has content to which a text label is imparted, the content source code generation unit 156 detects text for the content and generates text data. The content source code generation unit 156 may perform text detection from the web design acquired by the web design acquisition unit 155.

When a part of the content of the web design corresponds to the above-described component, the content source code generation unit 156 may generate a source code corresponding to the component on the basis of the teacher data. When the web design includes a component to which a button label is imparted as an example, the content source code generation unit 156 generates a source code (CSS code as an example) of the component on the basis of the teacher data.

As described above, when the web design includes the image, the web design acquisition unit 155 may acquire the image data (image material) corresponding to the image. In this case, the content source code generation unit 156 may generate position information for arranging an image based on the image data in the web content on the basis of a position of the image in the web design. When the web design has the content to which the image label is imparted, the content source code generation unit 156 associates the image to which the label is imparted with the image data acquired by the web design acquisition unit 155 on a one-to-one basis. That is, the content source code generation unit 156 matches the image to which the image label is imparted with the image data (image material) matching the image.

The content source code generation unit 156 may associate the image included in the web design acquired by the web design acquisition unit 155 with the image data (image material) on a one-to-one basis. In this case, the content source code generation unit 156 can associate the image included in the web design with the image data when a degree of similarity between the image and the image data is high.

The content source code generation unit 156 may generate position information on a position at which the content is arranged in the web content to correspond to a layout of the content of the web design on the basis of the position of the content in the web design. The content source code generation unit 156 generates information (position information) on a position for arranging text, a button, an image, or the like in the web content on the basis of detection information when the content of the web design is detected and results of text detection, button generation, and image matching. The position information is information for arranging, for example, the text, the button, and the image (image data) in the web content. For the position information, for example, coordinates of a coordinate system in the web content may be generated from coordinates of a coordinate system in the web design. Further, the position information, for example, may be coordinates of a center position of the content (the text, the button, the image, or the like) or may be coordinates of an upper left (or upper right, lower left, or lower right) position.

That is, the content source code generation unit 156 generates position information for arranging the text (text data) in the generated web content to correspond to a position of the text in the web design. Further, the content source code generation unit 156 generates position information for arranging a button in the generated web content to correspond to a position of the button in the web design. Further, the content source code generation unit 156 generates position information for arranging an image (image data) in the generated web content to correspond to a position of the image in the web design. The content source code generation unit 156 may correct the label and the position information on the basis of an operation of the user with respect to the input unit 400. That is, the content source code generation unit 156 may correct label information of the text, the image, the button, and the like, and position information thereof.

The content source code generation unit 156 generates a source code of the web content by combining a CSS code of the text, the image (image data), the button, or the like (component) with position information thereof, for example. The content source code generation unit 156 displays the web content on the display unit 500 on the basis of the generated source code.

The communication unit 200, the storage unit 300, the input unit 400, and the display unit 500 of the second embodiment may have the same configurations as the communication unit 200, the storage unit 300, the input unit 400, and the display unit 500 described in the first embodiment.

Figure 8:
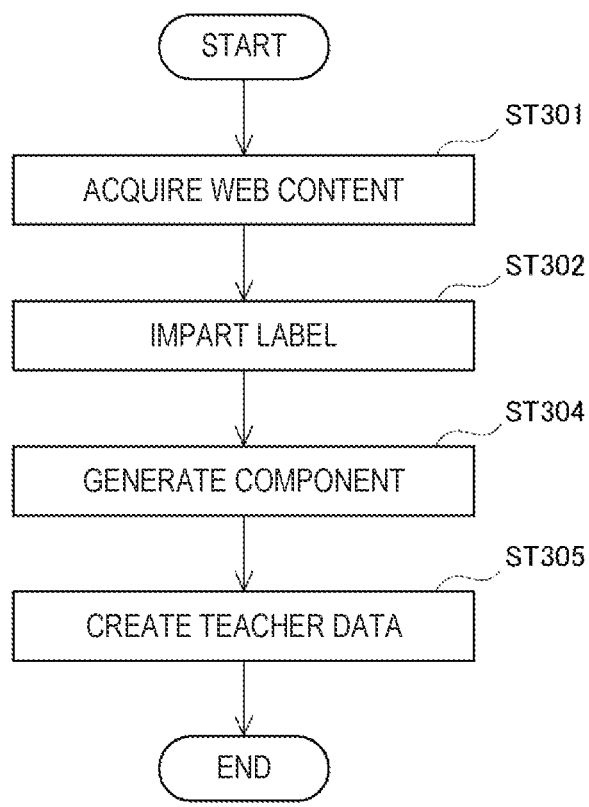
FIG. 8 is a flowchart illustrating a flow of a process when teacher data is created according to the second embodiment.

Next, a method for automatedly generating web content according to the second embodiment will be described. First, a flow of a process when teacher data is created will be described. FIG. 8 is a flowchart illustrating a flow of a process when teacher data is created according to the second embodiment.

In step ST301, the label impartment unit 151 acquires the web content posted on a website released on the Internet. The label impartment unit 151 may automatically acquire a plurality of pieces of web content.

The web content automated generation system 2 may acquire the web content as follows, as in the first embodiment, instead of the label impartment unit 151. That is, the website search unit (the website search module 112: see FIG. 1) accesses the Internet via the communication unit 200 and searches for a website. The web page display unit (the web page display module 113: see FIG. 1) displays the website hit by the search on the display unit 500 using a browser. The image data acquisition unit (the image data acquisition module 114: see FIG. 1) acquires the web content of the website displayed on the display unit 500 as image data.

In step ST302, the label impartment unit 151 imparts a label to the web content (image data) acquired in step ST301 for each piece of content. For example, when the web content (image data) includes an image, the label impartment unit 151 imparts an image label to the image. For example, when the web content (image data) includes text, the label impartment unit 151 imparts a text label to the text. For example, when the web content (image data) includes a button, the label impartment unit 151 imparts a button label to the button.

In step ST303, the creation unit 153 creates, for example, a component constituting a part of the web content on the basis of a source code such as a CSS code. The component is, for example, a button or the like. The creation unit 153 creates a plurality of components of which shapes, sizes, colors, and the like have been changed.

In step ST304, the learning unit 154 creates teacher data on the basis of the content to which the label is imparted in step ST302. For example, the learning unit 154 creates the teacher data on the basis of ascertaining a feature quantity of the content to which the label is imparted. Further, the learning unit 154 creates the teacher data on the basis of the source code used in step ST304 and the generated configuration. For example, the learning unit 154 creates teacher data by associating the source code with the component.

Figure 9:
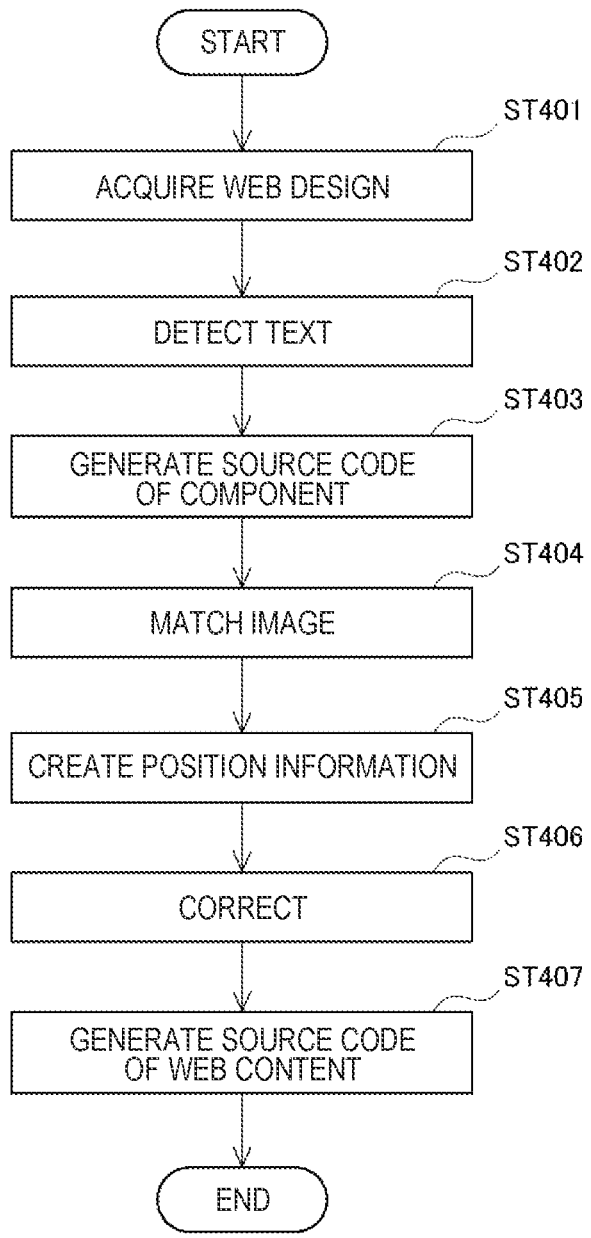
FIG. 9 is a flowchart illustrating a flow of a process when web content is automatedly generated according to the second embodiment.

Next, a flow of a process when web content is automatedly generated will be described. FIG. 9 is a flowchart illustrating a flow of a process when web content is automatedly generated according to the second embodiment.

In step ST401, the web design acquisition unit 155 acquires the web design for creating the web content. In this case, when the web design includes an image and data of the image (image data) is uploaded by the user, the web design acquisition unit 155 stores image data in the storage unit 300.

In step ST402, the content source code generation unit 156 imparts a label to each piece of content of the web design acquired in step ST401, and detects the text for the content to which the text label indicating the text is imparted. That is, when the web design acquired in step ST401 includes content to which the text label is imparted, the content source code generation unit 156 detects text in the content using a trained model and generates text data. The content source code generation unit 156 may perform text detection from the web design acquired in step ST401.

In step ST403, when the content of the web design includes a component corresponding to the content of the web design, the content source code generation unit 156 generates a source code corresponding to the component on the basis of the teacher data generated in step ST305. That is, when the web content includes a component to which a button label is imparted as an example, the content source code generation unit 156 generates a source code (CSS code as an example) of the component on the basis of the teacher data.

In step ST404, when the web design includes content to which the image label is imparted, the content source code generation unit 156 associates the image to which the label is imparted with the image data acquired in step ST401 in a one-to-one basis. That is, the content source code generation unit 156 matches an image to which the image label is imparted with image data matching the image. The content source code generation unit 156 may associate the image included in the web design acquired in step ST401 with the image data on a one-to-one basis.

In step ST405, the content source code generation unit 156 generates position information for arranging content in the web content on the basis of a position at which the content is described in the web design acquired in step ST401. The content source code generation unit 156 generates information (position information) on positions at which a text, a component, and an image are arranged in the web content on the basis of the detection information when the content of the web design is detected and results of text detection, component (button) generation, and image matching.

In step ST406, the content source code generation unit 156 may correct the position information and the like (the label and the position information) created in step ST405 on the basis of, for example, the operation of the user with respect to the input unit 400.

In step ST407, the content source code generation unit 156 generates a source code according to the web design acquired in step ST401 on the basis of the text detected in step ST402, the source code of the component generated in step ST403, the image (image data) matched in step ST404, the position information generated in step ST405, and the correction performed in step ST406.

Next, effects of the second embodiment will be described.

The web content automated generation system 2 includes a label impartment unit 151 configured to acquire web content and impart a label to the web content for each piece of content, a creation unit 153 configured to create a component constituting a part of the web content on the basis of a source code for generating the web content, a learning unit 154 configured to acquire teacher data on the basis of the content to which the label is imparted by the label impartment unit 151 and on the basis of the source code and the component created by the creation unit 153, a web design acquisition unit 155 configured to acquire a web design, and a content source code generation unit 156 configured to acquire the content of the web design on the basis of the web design acquired by the web design acquisition unit 155 and the teacher data acquired by the learning unit 154, and generate a source code according to the content. Accordingly, according to the web content automated generation system 2, it is possible to generate the source code automatedly when the web design is input, by learning the teacher data in advance. Therefore, the web content automated generation system 2 can generate the web content desired by the user.

In the web content automated generation system 2, when a part of the content of the web design corresponds to the component, the content source code generation unit 156 may generate a source code corresponding to the component on the basis of the teacher data.

Accordingly, even when the web content desired by the user includes a component such as a button, the web content automated generation system 2 can generate web content including the component.

In the web content automated generation system 2, the content source code generation unit 156 may generate the position information on the position at which the content is arranged in the web content to correspond to a layout of the content of the web design on the basis of the position of the content in the web design.

Accordingly, the web content automated generation system 2 can generate web content according to the web design.

In the web content automated generation system 2, when the web design includes an image, the web design acquisition unit 155 may acquire the image data corresponding to the image. In this case, the content source code generation unit 156 may generate position information for arranging the image based on the image data in the web content on the basis of the position of the image in the web design.

Accordingly, even when the web design includes an image, the web content automated generation system 2 can generate web content including the image according to the web design.

Each unit of the web content automated generation system 2 described above may be embodied as a function of an arithmetic processing unit or the like of a computer. That is, the label impartment unit 151, the creation unit 153, the learning unit 154, the web design acquisition unit 155, and the content source code generation unit 156 of the web content automated generation system 2 may be embodied as a label impartment function, a creation function, a learning function, a web design acquisition function, and a content source code generation function by, for example, an arithmetic processing device of a computer, respectively.

A web content automated generation program can embody each function described above on the computer. The web content automated generation program may be recorded on a non-transitory recording medium that can be read by the computer, such as an external memory or an optical disc.

Figure 10:
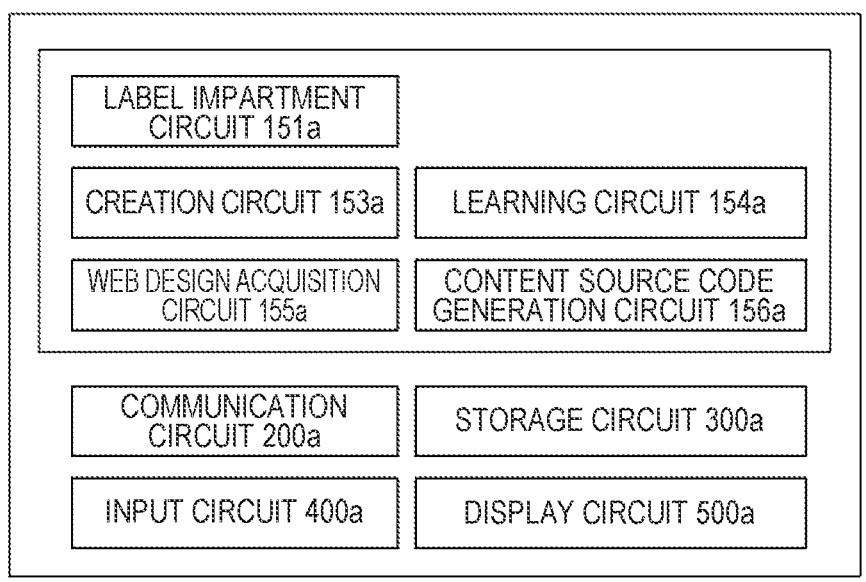
FIG. 10 is a block diagram illustrating a web content automated generation system according to a modification example.

Further, each unit of the web content automated generation system 2 may be embodied by the arithmetic processing unit or the like of the computer, as described above. The arithmetic processing unit or the like is configured of, for example, an integrated circuit. Therefore, each unit of the web content automated generation system 2 may be embodied as a circuit constituting the arithmetic processing unit or the like. That is, the label impartment unit 151, the creation unit 153, the learning unit 154, the web design acquisition unit 155, and the content source code generation unit 156 of the web content automated generation system 2 may be embodied as a label impartment circuit 151*a*, a creation circuit 153*a*, a learning circuit 154*a*, a web design acquisition circuit 155*a*, and a content source code generation circuit 156*a* constituting the arithmetic processing device or the like of computer, as illustrated in FIG. 10. Further, the communication unit 200, the storage unit 300, the input unit 400, and the display unit 500 of the web content automated generation system 2 may be configured of an integrated circuit or the like and embodied as, for example, a communication circuit 200*a*, a storage circuit 300*a*, an input circuit 400*a*, and a display circuit 500*a* (see FIG. 10). Further, the communication unit 200, the storage unit 300, the input unit 400, and the display unit 500 of the web content automated generation system 2 may be configured of, for example, a plurality of devices as a communication device, a storage device, an input device, and a display device.

The invention claimed is:

1. A web content automated generation system for generating web content described by HTML, the web content automated generation system comprising:
   a memory storing computer readable instructions; and
   at least one processor configured to execute the computer readable instructions to,
   receive a search query from a user, the search query including a plurality of keywords;
   acquire a plurality of web content, each of the plurality of web content posted on websites released on the Internet, and the acquired plurality of web content acquired as a single piece of image data, the acquiring the plurality of web content including searching for a plurality of websites to use to generate a plurality of pieces of teacher data, the searching including searching for websites released on the Internet automatically using a crawler based on the received search query;

acquire a plurality of source code corresponding to the acquired plurality of web content, each of the plurality of source code including at least HTML data acquired from the respective web content;

generate the plurality of pieces of teacher data based on the plurality of pieces of image data corresponding to the plurality of acquired web content and the plurality of acquired source code corresponding to the plurality of acquired web content;

receive input image data from the user, the input image data including a user web content design, the input image data being a single piece of image data;

analyze a degree of relevance between the input image data and each of the plurality of pieces of teacher data;

select at least one teacher data of the plurality of teacher data having a high degree of relevance to the input image data based on results of the analysis; and generate new content source code corresponding to the input image data using source code corresponding to the selected at least one teacher data.

2. A web content automated generation system comprising:

a memory storing computer readable instructions stored thereon; and at least one processor configured to execute the computer readable instructions to, receive a search query from a user, the search query including a plurality of keywords;

acquire web content, each of the plurality of web content posted on websites released on the Internet, the acquiring the web content including searching for a plurality of websites to use to generate a plurality of pieces of teacher data, the searching including searching for websites released on the Internet automatically using a crawler based on the received search query;

add at least one label to each web content of the plurality web content, the at least one label indicating sub-content of the respective web content;

create a plurality of components each corresponding to a part of each web content of the plurality of web content based on source code corresponding to the respective part of each web content;

generate the plurality of pieces of teacher data based on the respective labels for the plurality of sub-content and the respective created component, the generated plurality of pieces of teacher data including source code corresponding to the respective labels for the plurality of sub-content;

receive a user web design from the user, the user web design for creating new web content; and generate new source code corresponding to the received user web design using source code corresponding to the selected at least one teacher data.

3. The web content automated generation system according to claim 2, wherein the at least one processor is further configured to:

determine at least one component corresponding to at least one part of the user web design; and generate the source code based on the teacher data corresponding to the determined at least one component.

4. The web content automated generation system according to claim 3, wherein the at least one processor is further configured to:

generate position information indicating a position at which each of the determined at least one component is arranged in a layout of the web content of the user web design.

5. The web content automated generation system according to claim 4, wherein the at least one processor is further configured to:

in response to the user web design including an image, acquire image data corresponding to the image, and generate position information for arranging an image based on the acquired image data based on a position of the corresponding image in the user web design.

6. The web content automated generation system according to claim 3, wherein the at least one processor is further configured to:

generate position information indicating a position at which each of the determined at least one component is arranged in a layout of the content of the user web design.

7. The web content automated generation system according to claim 6, wherein the at least one processor is further configured to:

in response to the web design including an image, acquire image data corresponding to the image, and generate position information for arranging an image based on the acquired image data based on a position of the corresponding image in the user web design.

8. A non-transitory computer readable medium storing computer readable instructions, which when executed by at least one processor, causes the at least one processor to:

receive a search query from a user, the search query including a plurality of keywords;

acquire a plurality of web content, each of the plurality of web content posted on websites released on the Internet, and each of the acquired plurality of web content acquired as a single piece of image data, the acquiring the plurality of web content including searching for a plurality of websites to use to generate a plurality of pieces of teacher data, the searching including searching for websites released on the Internet automatically using a crawler based on the received search query;

acquire a plurality of source code corresponding to the acquired plurality of web content, the plurality of source code including at least HTML data acquired from the respective web content;

generate the plurality of pieces of teacher data based on the plurality of pieces of image data corresponding to the plurality of acquired web content and the plurality of acquired source code corresponding to the plurality of acquired web content;

receive input image data from the user, the input image data including a user web content design, the input image data being a single piece of image data;

analyze a degree of relevance between the input image data and each of the plurality of pieces of teacher data;

select at least one teacher data of the plurality of teacher data having a high degree of relevance to the input image data based on results of the analysis; and generate new content source code corresponding to the input image data using source code corresponding to the selected at least one teacher data.

9. The non-transitory computer readable medium according to claim 8, wherein the at least one processor is further caused to:

analyze the plurality of web content, each web content of the plurality of web content including a plurality of sub-content; and generate the plurality of pieces of teacher data by generating a plurality of source code components corresponding to each sub-content of the plurality of sub-content associated with the respective piece of teacher data.

10. The non-transitory computer readable medium according to claim 9, wherein the at least one processor is further caused to perform the analyzing the degree of relevance between the input image data and each of the plurality of pieces of teacher data by:

analyzing a degree of relevance between the input image data and each sub-content included in each piece of teacher data of the plurality of pieces of teacher data.

11. The non-transitory computer readable medium according to claim 9, wherein the at least one processor is further caused to:

determine position information indicating a position at which each component of the user web content design is arranged in the input image data, the user web content design including a plurality of components; and generate the new content source code corresponding to the input image data based on the selected at least one piece of teacher data, the generating the new content source code including arranging the source code associated with each component of the user web content design based on the determined position information associated with each component of the user web content design.

* * * * *